United States Patent [19]

Sugawara et al.

[11] Patent Number: 4,925,742

[45] Date of Patent: May 15, 1990

[54] THIN-FILM HAVING LARGE KERR ROTATION ANGLE AND PRODUCTION PROCESS THEREOF

[75] Inventors: Eishu Sugawara; Taketoshi Nakayama; Tsuyoshi Masumoto, all of Sendai, Japan

[73] Assignees: Research Development Corporation of Japan, Tokyo; Tokin Corporation, Sendai, both of Japan

[21] Appl. No.: 259,489

[22] Filed: Oct. 18, 1988

Related U.S. Application Data

[63] Continuation of Ser. No. 71,188, Jul. 8, 1987, abandoned.

[30] Foreign Application Priority Data

Jul. 18, 1986 [JP] Japan ................................. 61-168093

[51] Int. Cl.$^5$ ............................................. H01F 10/00
[52] U.S. Cl. ..................................... 428/692; 148/304; 148/305; 204/192.2; 428/694; 428/900
[58] Field of Search ....................... 428/692, 694, 900; 148/314, 305; 204/192.2

[56] References Cited

U.S. PATENT DOCUMENTS

| | | | |
|---|---|---|---|
| 2,945,744 | 7/1960 | Knox ............................. | 252/62.51 R |
| 3,399,957 | 9/1968 | Shafer ........................... | 252/62.51 R |
| 3,485,551 | 12/1969 | Guggenheim et al. ......... | 252/62.51 R |
| 3,527,577 | 9/1970 | Fan et al. ...................... | 252/62.51 R |
| 3,676,082 | 7/1972 | Robbins ........................ | 252/62.51 R |
| 4,415,464 | 11/1983 | Asahara et al. .............. | 252/62.51 R |

FOREIGN PATENT DOCUMENTS 133542 7/1985 Japan .
253039 12/1985 Japan .

OTHER PUBLICATIONS

"Magnetic Glasses", Moorjani et al., Elsevier Press, New York, N.Y., 1984.

Primary Examiner—Paul J. Thibodeau
Attorney, Agent, or Firm—Flynn, Thiel, Boutell & Tanis

[57] ABSTRACT

A thin film having a large high Kerr rotation angle is formed of a compound having a composition represented by the following formula (I):

$$J_x L_y Q_{(100-x-y)} \qquad (I)$$

wherein
J: at least one of F, Cl, Br and I;
L: at least one of B, C, Al, Si, P, As, Sb, Bi, Se, Te, Ti, V, Cr, Mn, Ni, Ga, Ge, Zr, Nb and Mo;
Q: at least one of Fe and Co;
x: a value of 3–80; and
y: a value satisfying the following equation (II):

$$3 \leq x + y \leq 80 \quad (II)$$

The film is produced by reacting a halogen or halogen-containing gas, which has occurred as a result of decomposition of a halogen compound, with a metal plasma or halogen-containing metal plasma and allowing the resultant component to deposit as a thin film on a substrate.

12 Claims, 14 Drawing Sheets

THIN-FILM HAVING LARGE KERR ROTATION ANGLE AND PRODUCTION PROCESS THEREOF

This application is a continuation of U.S. Ser. No. 071,188, filed July 8, 1987, now abandoned.

This invention relates to a thin film of a magneto-optical material, especially, a thin film having a large Kerr rotation angle and a thin film capable of showing transparency and perpendicular magnetic anisotropy, and to a production process thereof.

As an optical technology making use of the magneto-optical Kerr effect, there is now magneto-optical recording. The present invention is applicable satisfactorily to optical recording media which are indispensable for magneto-optical recording.

As a magneto-optical material having a large Kerr rotation angle, there are halogen compound systems, typically, $CrX_3$ (X: Cl, Br or I). This material shows a rotation angle as large as $\theta_K=3.5°$ near 425.5 nm at a low temperature of 1.5 K.

Among oxide systems, there are not many materials having large Kerr rotation angles. $CoFe_2O_4$ and $Eu_3Fe_5O_{12}$ may however be mentioned by way of example. It has been reported that $CoFe_2O_4$ shows $\theta_F=3.3\times10^4$ deg/cm at 780 nm and exhibits $\theta_K=0.6°$ when enhanced by a refecting plate. In the case of $Eu_3Fe_5O_{12}$, a value $\theta_K=0.17°$ (at 297 nm) has been reported.

There are a variety of magneto-optical materials among metal systems. As polycrystalline materials, there may be mentioned thin MnBi alloy film and thin PtMnSb Heusler alloy film. This thin PtMnSb film shows $\theta_K=1.82°$ (at 5 kOe) at 725–716.7 nm and room temperature. No perpendicular magnetic films have however been produced yet.

Turning next to amorphous materials, perpendicular magnetic films can be obtained from rare earth systems. They show $\theta_K=0.3-0.4°$.

Metallic materials are accompanied by an inherent problem that they lose optical transparency at a film thickness of about 1000 Å even when a metalloid such as Mn is contained therein.

The following properties may be mentioned as typical properties required for magneto-optical recording media:

(1) Perpendicular magnetic film:

It is required to be a perpendicular magnetic film in order to achieve a high recording density. Relationship $K\perp>2\pi Ms^2$ ($K\perp$: perpendicular magnetic anisotropy constant, Ms: saturation magnetization) should be satisfied.

(2) Writing power:

As methods for thermally writing information in a perpendicular magnetic film, there may be mentioned the thermo-magnetic recording at Curie-point, the thermo-magnetic recording at compensation-point, etc. From the parallel consideration of the thermal stability of recorded information and the desire for smaller writing power, 100–200° C. seems to be appropriate as the temperature increase.

(3) SN ratio (signal-to-noise ratio):

The following causes may be contemplated as noise sources for magneto-optical disk devices:
(i) Variations of a light source.
(ii) Noises generated from a medium.
(iii) Noises attributed to the incompleteness of an analyzer and/or polarizer.
(iv) Noises of an amplifier in an amplification circuit for electrical signals.

$S/N \propto R.\theta_K$ (R: reflectivity of film, $\theta_K$: Kerr rotation angle). In order to increase the S/N ratio, it is hence necessary to reduce the noise, to increase the reflectivity of the material and to increase the effective Kerr rotation angle.

(4) Stability and possibility of easy production:
(i) The medium should be stable mechanically, thermally and chemically. It should permit several writing operations and long-term
(ii) Disks should be produced easily. The cost per bit should be reasonable.

Magneto-optical materials have both merits and demerits.

When the magneto-optical Kerr effect is utilized, the purpose is primarily to produce a magneto-optical recording medium. An extremely large number of materials has been developed to date making use of the magneto-optical Kerr effect.

MnBi drew attention at the beginning. With a view toward improving the drawbacks of MnBi that it has a high Curie temperature and undergoes phase transformation, MnSb, MnAlGe and $Mn_{1-x}Ti_xBi$ were then developed. It was however CuMnBi that brought about the best data as a magneto-optical disk among polycrystalline media. Since CuMnBi is polycrystalline, it is said to be the most serious problem of this material that it produces a lot of medium noise. On the other hand, PtMnSb which shows the largest Kerr rotation angle at room temperature requires annealing at a high temperature and for a long period of time in order to form a super lattice as a Heusler alloy. Moreover, it cannot be converted into a perpendicular magnetic film as mentioned above. It is hence not a material which can be used actually now. $CoFe_2O_47$ is also interesting because of its large Faraday rotation angle upon use of an enhancement. However, it also requires a refractory substrate for vacuum evaporation. Some materials having very large performance indexes $\sqrt{R}.\theta_K$ have been found among uranium compounds. Their Curie temperatures are however below room temperature so that they are impractical.

It may be contemplated to use either a single crystal or an amorphous material in order to get rid of intergranular noise which is a drawback inherent to polycrystalline materials. Among single crystalline materials, GdIG (or a perpendicular magnetic film of BiYIG) has a compensation temperature close to room temperature and its performance index $2F/\alpha$ (F: Faraday rotation coefficient, $\alpha$: absorption coefficient) as a Faraday device is sufficiently large. However, $\alpha$ is small. A thick film is thus required. The above material is therefore accompanied by such problems that difficulties are encountered in reducing the bit dimensions and also in producing a large disk-type recording medium and the production cost is high. Researches are now underway using metals and oxides with a view toward producing a desired medium on a substrate by forming a multilayer film in which atoms are superposed in groups of several atoms per layer. None of these researches have however resulted in a practically-usable material.

From the viewpoint of practical utility, the development of rare earth element-Co and Fe (transition metal) alloy amorphous materials is now the subject of a great deal of work and practical data will be reported.

A description will next be made of rare earth-transition metal amorphous films.

(1) Saturation magnetization, Ms:

The spins of a rare earth element and an iron-group transition metal are arranged in antiparallel relation. The magnetic moment of the rare earth element and iron family transition metal is therefore the sum of both sublattices in the case of a light rare earth element and the difference between both sublattices in the case of a heavy rare earth element. In the case of a heavy rare earth element, Ms, Hc and Tc can therefore be adjusted by choosing the composition. It is hence possible to satisfy the condition for a perpendicular magnetic film, namely, $K\perp > 2\pi Ms^2$ so that the formation of a perpendicular magnetic film is facilitated.

(2) Perpendicular magnetic anisotropy, $K\perp$:

A rare earth element-transition metal film has large perpendicular magnetic anisotropic energy, which may be attributed, for example, to:

(i) Oriented arrangement of rare-earth atoms pair and magnetic anisotropy; and (ii) Shape anisotropy due to a film structure such as prismatic structure, and internal stress and magnetostriction of the film.

Since perpendicular magnetic anisotropy varies easily in accordance with the Ar partial pressure and composition, the large perpendicular magnetic anisotropic energy has not been fully elucidated as to its sources.

(3) Coercive force, Hc:

The mechanism of occurrence of coercive force has not been elucidated. When there is a single cylindrical magnetic domain of reverse magnetization in a perpendicular magnetic film, the minimum domain diameter, $d_{min}$, which can remain stable is approximated as:

$$d_{min} = \sigma_w/Ms.Hc$$

wherein $\sigma_w$ is the energy density of the domain wall and Hc is the coercive force of the film. A high-density recording material requires a high degree of perpendicular magnetic anisotropy and a coercive force of several kOe. In this respect, rare earth elements can satisfactorily meet the conditions.

(4) Kerr rotation angle, $\theta_K$:

Since the magnetic field dependence of the Kerr rotation angles of rare earth element-transition metal films is shown by figures similar to their M-H curves in many instances, Kerr rotation angle is considered to be proportional with M. However, it is not very large, namely, 0.3°–0.4°.

It is the greatest drawback of rare earth element-transition metal amorphous films that they are susceptible to oxidation and are hence prone to deterioration when left over without protective films. There is another problem that optimal conditions for their formation are severe.

The current magneto-optical recording media are primarily made of rare earth element-transition metal systems as have been described above. The Kerr rotation angles ($\theta_K$) of these media are however on the order of 0.3°–0.4°. Compared with other optical recording apparatus, for example, a system in which the intensity of reflection is read by using the ruggedness of a medium, they are accompanied by a drawback that their S/N ratios are small, namely, below 60 dB. For this reason, they tend to develop errors and are usable in certain limited fields only. Their merit that they permit rewriting have not been utilized fully.

SUMMARY OF THE INVENTION

There is hence a strong desire for the development of a recording material having a large Kerr rotation angle and a film capable of enlarging the Kerr rotation angle.

An object of this invention is to provide a halogen-containing ferromagnetic transparent film which in spite of bonding with the halogen atoms, does not cause any excessively large peak shift compared with a 3d transition metal (Fe, Co or Ni) in a soft X-ray spectrum, in other words, is metallic, retains ferromagnetism, gives a great reflected light quantity, and has transparency owing to the inclusion of halogen atoms, a large Faraday coefficient and a large Kerr rotation angle, particularly, a halogen-containing transparent film having perpendicular magnetic anisotropy, as well as a production process thereof.

In one aspect of this invention, there is thus provided a thin film hereinafter called "halogen-containing thin transparent film" having a large Kerr rotation angle, comprising a compound having a composition represented by the following formula (I):

$$J_xL_yQ_{(100-x-y)} \quad (I)$$

wherein

J: an element represented by any one of element symbols F, Cl, Br and I, or a combination thereof;

L: an element represented by any one of element symbols B, C, Al, Si, P, As, Sb, Bi, Se, Te, Ti, V, Cr, Mn, Ga, Ge, Zr, Nb and Mo, or a combination thereof;

Q: either one of Fe, Ni or Co, or a combination thereof;

x: a value of 3–80; and y: a value satisfying the following equation (II):

$$3 \leq x+y \leq 80 \quad (II)$$

The thin film preferably shows both transparency and perpendicular magnetic anisotropy. Namely, it is preferably a perpendicular magnetic thin transparent film (this preferable thin film will hereinafter be called "perpendicular magnetic thin transparent film").

In another aspect of this invention, there is also provided a process for the production of a halogen-containing thin film having a large Kerr rotation angle and composed of a compound of the above-described composition, which comprises reacting a halogen or halogen-containing gas, which has occurred as a result of decomposition of a halogen compound, with a metal plasma or halogen-containing metal plasma and allowing the resultant compound to deposit as a thin film on a substrate.

The present invention has brought about numerous advantages, including the following representative advantages:

(1) The halogen-containing thin transparent film of this invention has a large Kerr rotation angle ($\theta_K$) of 0.5° at an F content of 50 at.% (atomic %) in the wavelength range of He-Ne laser. At 700–800 nm, $\theta_K$, increased to 0.7°. It can therefore be used suitably for magneto-optical recording media which make use of the magneto-optical Kerr effect.

(2) The halogen-containing thin transparent film of this invention contains chemical bonds which do not cause peak shifts with respect to $L\alpha$ and $L\beta$ rays in its X-ray emission spectrum even if it has a high halogen content. It hence has both ferromagnetism and optical transparency.

(3) The hysteresis of the $\theta_K$-H curve of the perpendicular magnetic thin transparent film of this invention presents a curve specific to perpendicular magnetic films. Although the perpendicular magnetic thin transparent film can itself serve as a magneto-optical recording material, it may be combined with another perpendicular magnetic film such as TbFeCo film so that a still greater Kerr rotation angle can be obtained owing to the provision of the enhancement and the combined Faraday rotation. The thus combined material is very useful as a magneto-optical disk memory medium.

(4) The halogen-containing thin transparent film can be obtained in any one of amorphous, crystalline and metastable forms by the production process of this invention. It is also possible to control the degree of chemical bonds as desired. It is also feasible to change the proportions of J and L in the compound of the above formula (I) as desired, so that the halogen-containing thin transparent film is obtained with a desired large rotation angle.

(5) According to the production process of this invention, a highly-reactive halogen gas is not introduced directly into a production apparatus. The materials of the production apparatus are therefore not corroded. This also prevents impurities from mixing in a thin film to be deposited.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE PREFERRED EMBODIMENTS

Figure 1:
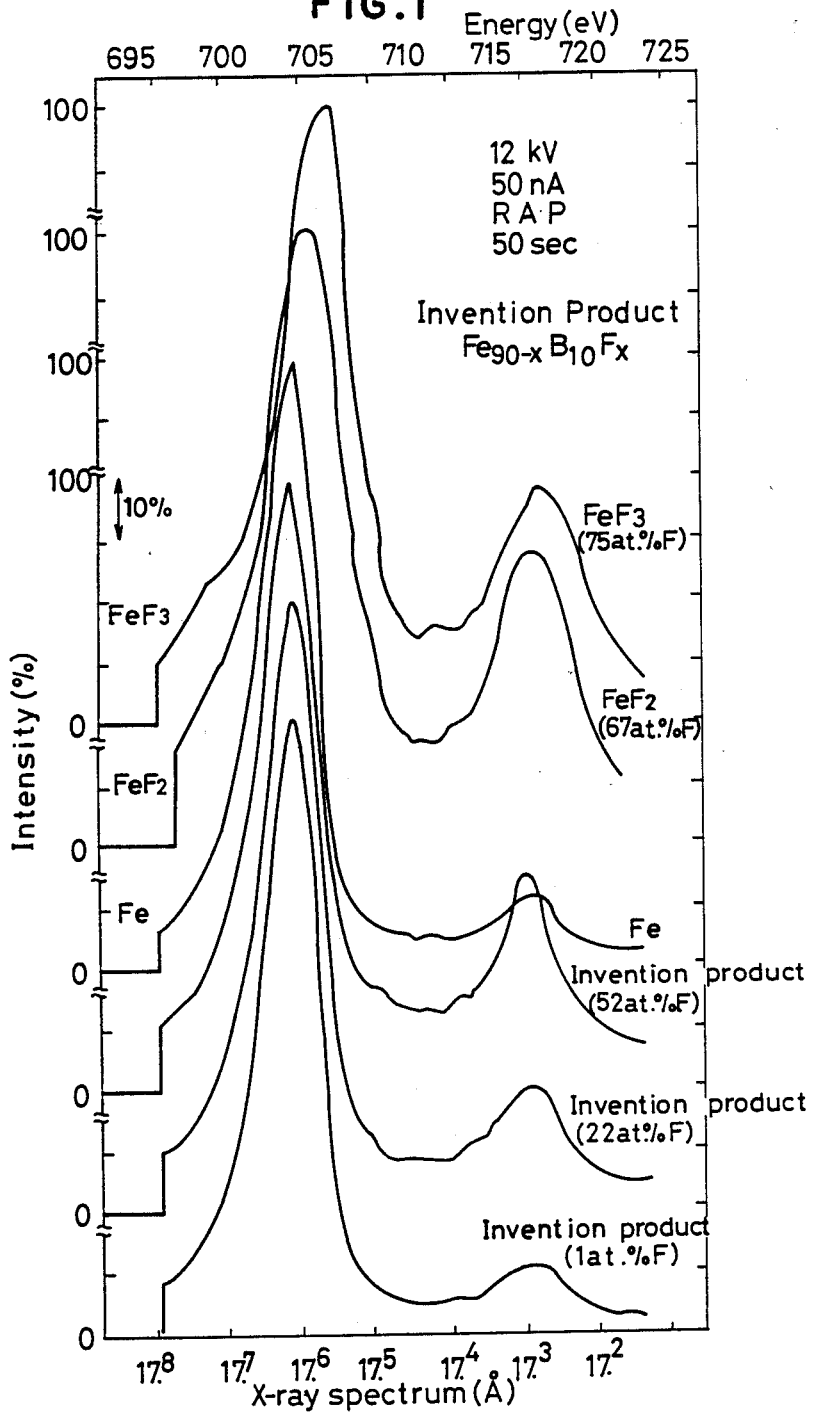
FIG. 1 shows the profiles of soft X-ray spectra of films of Fe and Fe-$F_n$ compounds (n: 2, 3) and those of invention films having large Kerr rotation angles respectively.

The present invention will now be described in detail below.

. The above halogen-containing thin transparent film and perpendicular magnetic thin transparent film may have various crystalline structures. Namely, they may take amorphous, crystalline or metastable state. Since their interatomic bonds do not give substantial influence to the 3d orbital, they do not give any large influence to the magnetic characteristics of the transparent films. The above thin films show therefore metallic and ferromagnetic properties and these films have optical transparency owing to the halogen element or elements, has transparency to light. Owing to their metallic nature, they can give large reflectivity. By the addition of rotations of light-deflecting angles both at the surface of the films and inside the films upon reflection, they exhibit large Kerr rotation angles.

The above films having the large Kerr rotation angles are applicable as optical modulators, which make use of the magneto-optical Kerr effect in magneto-and in integrated optical circuits such as optical switches, optical isolators and circulators. In magneto-optical disk memories making use of the magneto-optical Kerr effect, Kerr rotation angles can be increased further by using a multilayer structure which exhibits both magneto-optical Kerr effect and Faraday effect in combination. In view of such high applicability, they are indispensable for the present and future optical technology.

As properties characteristic to the halogen-containing thin transparent film of this invention, the following properties may be mentioned.

(a) Its chemical bonds do not cause any substantial chemical shift of the $L\alpha$ ray peak in a soft X-ray emission spectrum even if the element F is contained as much as 50 at.% or so.

(b) Accordingly, it can produce large magnetization. As a material capable of showing optical transparency, its magnetization is at least 60 emu/g at an F content of about 50 at.%. The average magnetic moment $\mu_B$ per Fe atom is about 1 $\mu_B$.

(c) Kerr rotation angle increases in proportion to the content of F. At an F content of 50 at.%, a rotation angle of 0.5° is shown in the wavelength range of He-Ne laser. A rotation angle as large as 0.7° was exhibited at 700–800 nm.

The perpendicular magnetic thin transparent film of this invention has the following property (d) in addition to the above-described properties (a) through (c).

(d) A film having perpendicular magnetic anisotropy can be formed by adjusting its production conditions, i.e., the ultimate vacuum of the backing pressure, the partial pressure of Ar, the sputtering temperature and the sputtering power.

The above properties (a)-(d) will hereinafter be described in further detail.

(a) Halogen atoms react with any metal and also react with many non-metals. Of such halogen atoms, F is most reactive. The reactivity decreases as the atomic number increases. This high reactivity of the element F is attributed to the low energy of an F—F bond, its extremely strong oxidizing power and its high electronegativity.

Due to this vigorous reactivity, halogen gases have not been contained at varied contents in metals. They have been used primarily as reactive gases in the dry etching technique or as carrier gases in the chemical vapor deposition process.

When bonded chemically with a metal, a halogen element is converted into crystals having optical transparency. It is however the general characteristics of halogen compounds that like $FeF_2$ and $FeF_3$ shown in FIG. 1, a considerable peak shift of $L\alpha$ is observed along with an increase to its peak width, significant influence is given to the 3d level of the electron state of Fe, and antiferromagnetism or parasitic ferromagnetism is exhibited.

It is a characteristic feature of the production process of this invention that the $L\alpha$ peak shift is small. The profiles of $L\alpha$ and $L\beta$ peaks in a soft X-ray emission spectrum of Fe in the halogen-containing thin transparent film of this invention are shown for various halogen contents in FIG. 1. FIG. 2 illustrates the shifts of $L\alpha$ and $L\beta$ peaks, the ratios of $L\alpha$ peak heights to corresponding $L\beta$ peak heights, namely, $L\beta/L\alpha$ (height ratio), and the F-content dependence of the half widths of the $L\alpha$ peaks, in comparison with the corresponding data of Fe, $FeF_2$ and $FeF_3$.

Figure 2:
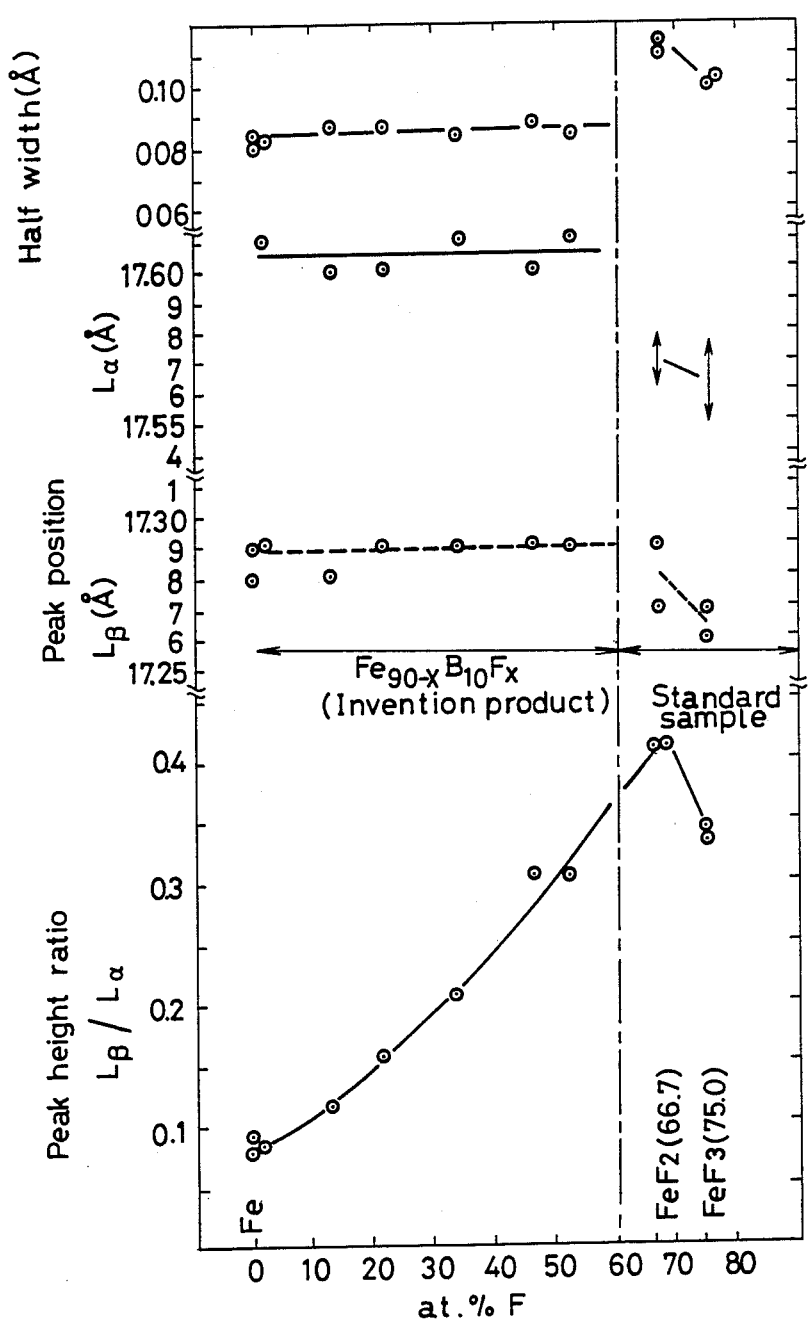
FIG. 2 is a graph showing the peak positions of $L\alpha$ and $L\beta$ of Fe, the peak height ratios of $L\alpha/L\beta$ and the half widths of the $L\alpha$ in soft X-ray spectra of the invention films having large Kerr rotation angles in comparison with Fe, $FeF_2$ compound and $FeF_3$ compound.

As apparent from FIG. 1 and FIG. 2, the halogen-containing thin transparent film of this invention, for example, the Fe-B-F film shows the same $L\alpha$ and $L\beta$ peak positions and peak half width as Fe and the height ratio of $L\beta/L\alpha$ increases as the content of the element F becomes higher. It is hence appreciated that no $L\alpha$ peak shift occurred unlike $FeF_2$ or $FeF_3$. This means that the chemical bond Fe-F are formed between their respective outermost orbitals and the inner orbital which affects considerably the magneto-optical effect, namely, the 3d orbital is not affected. The halogen-containing thin transparent film of this invention is therefore ferromagnetic and exhibits large magneto-optical effect owing, for example, to the action of the magnetic moment of the electron on the orbital of the 3d level.

Figure 3:
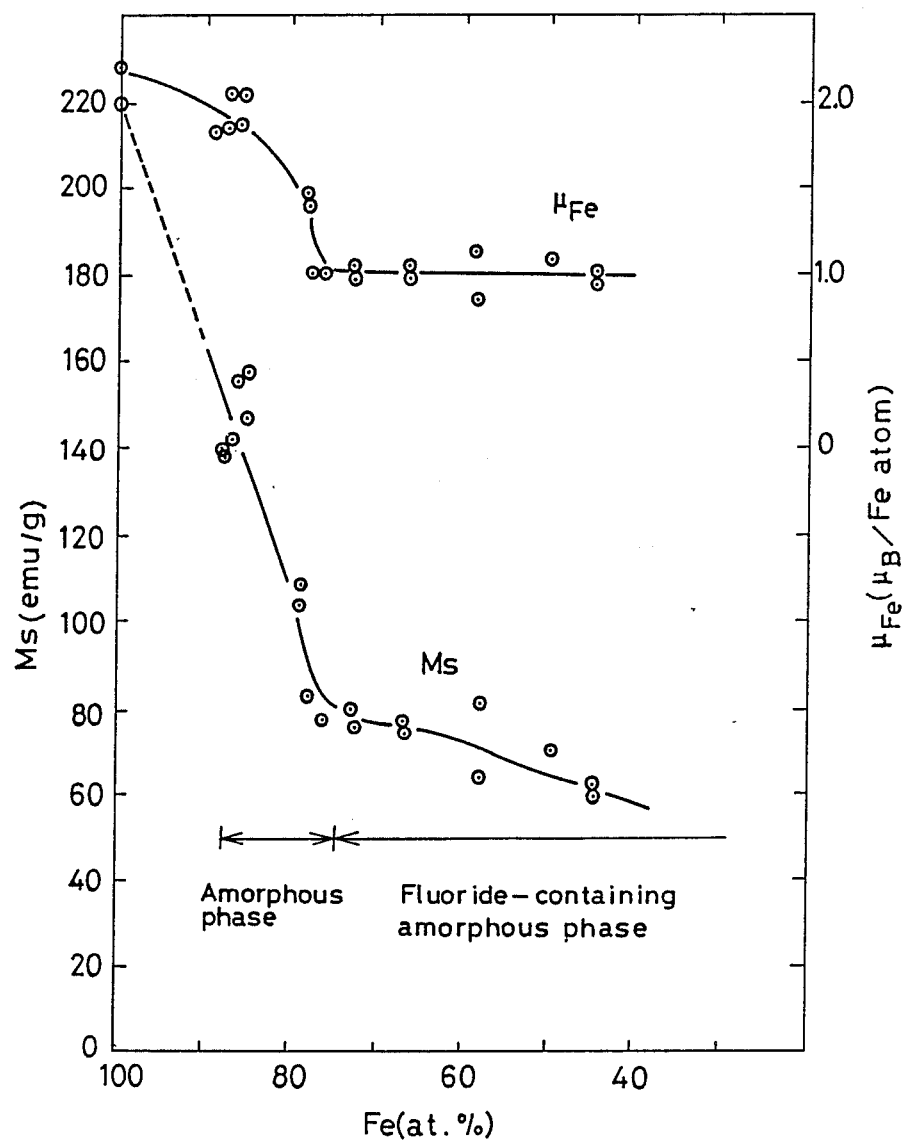
FIG. 3 graphically shows the Fe dependence of the saturation magnetization Ms of an Fe-B-F film and that of the average magnetic moment $\mu_{Fe}(\mu B$ per iron atom)

(b) FIG. 3 shows the Fe dependence of the saturation magnetization Ms of the Fe-B-F film and that of the average magnetic moment $\mu_{Fe}(\mu_B$ per iron atom). Owing to the existence of such an electron state as described above in (a), good optical transparency and high magnetic characteristics are exhibited even at an F content of about 50 at.%. The element F is an amorphous-forming element, and no large variations take place with respect to Curie temperature and crystallization temperature even when the F content increases. However, the saturation magnetization Ms becomes smaller as the F content drops. When the fluoride begins to grow in the amorphous phase, the degree of decrease of Ms is reduced. $\mu_{Fe}$(at 77 K) decreases in the amorphous phase as the F content increases. However, $\mu_{Fe}$ reaches about $1\mu_B$ when a fluoride phase appears. This is a typical reflection of Fe-F bonds.

(c) Owing to such a characteristic electron state of metal-gas elements as described above, the quantity of reflected light is large, the Kerr rotation angle increases as the content of F increases. At F contents of 40-50 at.%, high Kerr rotation angles were exhibited, namely, $\theta_K=0.5°$ in the wavelength range of He-Ne laser and $\theta_K=0.7°$ at 700-800 nm.

Figure 4:
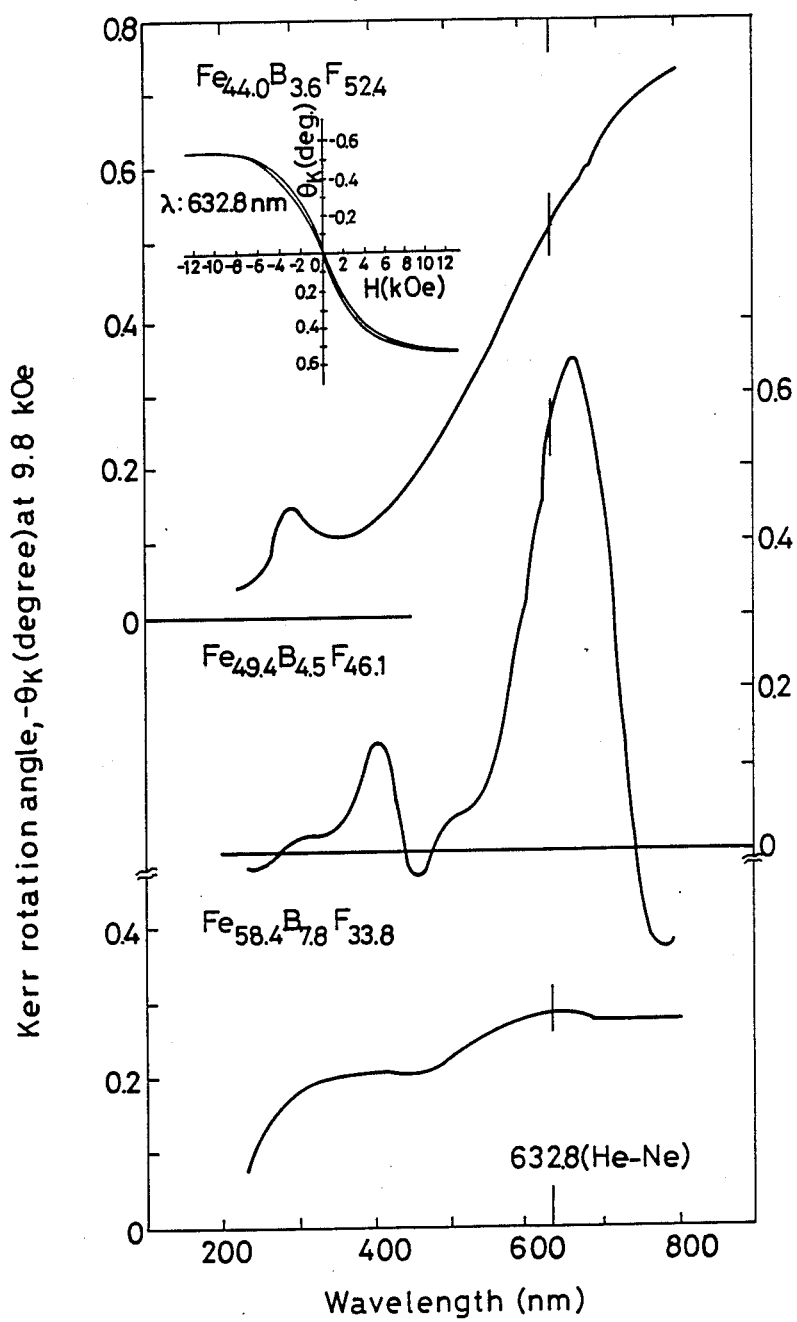
FIG. 4 diagrammatically illustrates the wavelength dependence of the Kerr rotation angle $\theta_K$ of an Fe-B-F film and the magnetic field dependence of the Kerr rotation angle $\theta_K$ of $Fe_{44.0}B_{3.6}F_{52.4}$ in He-Ne laser.

FIG. 4 shows the wavelength dependence of the Kerr rotation angles $\theta_K$ of Fe-B-F films by way of example. The films depicted in FIG. 4 are in-plane magnetizable films. Regarding their dependence on magnetic field, their rotation angles at 633 nm increase as the magnetic field becomes stronger. The higher the content of F, the higher the $\theta_K$. $\theta_K$ tends to become still higher on the side of longer wavelengths. The special Fe-F bond and the optical transparency of the element F seem to be combined together so that the resulting rotations at the surface of the film and inside the film probably contribute to the production of a large Kerr rotation angle. In the case of oxides, Kerr rotation angles by reflection without reflective plates are usually extremely small. The film of this invention shows a large Kerr rotation angle without any reflecting plate.

Figure 5:
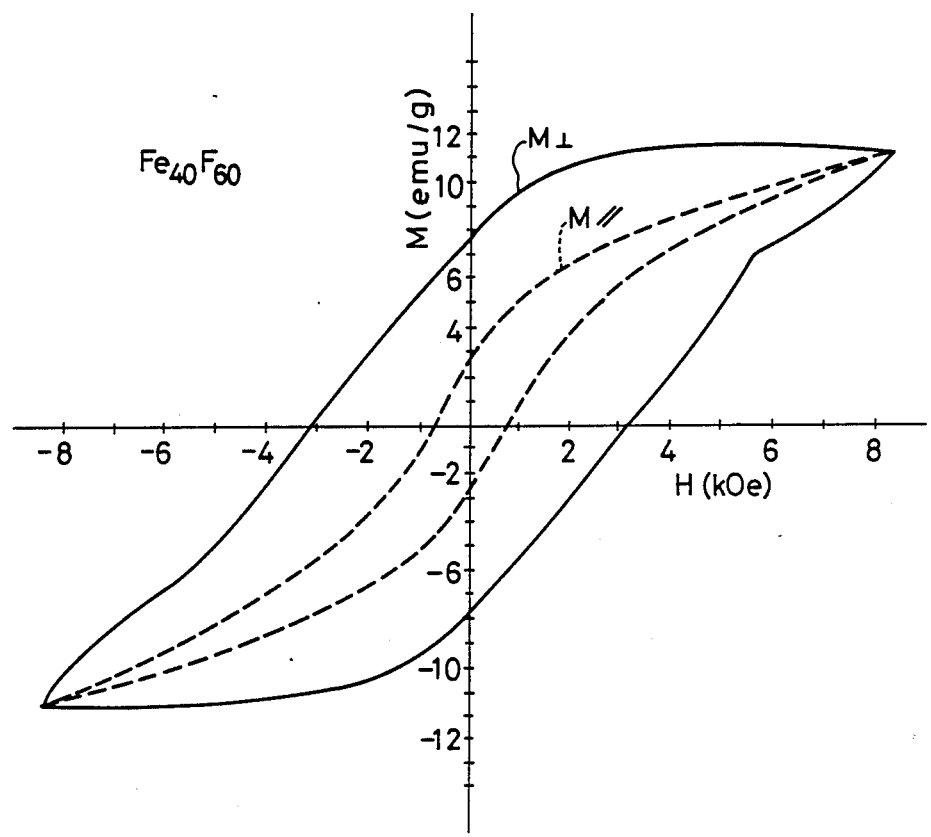
FIG. 5 depicts M-H hysteresis curves of a transparent and perpendicular magnetic $Fe_{40}F_{60}$ film.

(d) Turning next to the perpendicular magnetic thin transparent film, it is an in-plane magnetizable film. It can however be obtained as a transparent film having perpendicular magnetic anisotropy provided that film-forming conditions are chosen suitably. In FIG. 5, M-H hysteresis curves of an $Fe_{40}F_{60}$ film is shown by way of example. Out of the in-plane and perpendicular directions, anisotropy is shown clearly in the perpendicular direction. Vertical magnetic anisotropy energy has a positive value.

The process of this invention for the production of the halogen-containing thin transparent film makes use of reactive film formation process. This process is carried out in a state in which at least one of the components of a compound to be formed in the form of a thin film is contained in a vapor phase.

A reactive Rf,DC sputtering apparatus may be used by way of example as a production apparatus. This reactive sputtering involves both physical sputtering and chemical sputtering. On a substrate, a thin film is formed at a low temperature and in a state that the energy of bombardment to the substrate is low. Because of reactive sputtering, it is possible to vary the gas partial pressure and the output to the target so that optically-transparent films of various structures, namely, in amorphous, crystalline and metastable forms can be obtained. It is also possible to adjust the degree of chemical bonds (ionization degree) into various levels.

A halogen compound is decomposed in the production process of this invention, whereby a halogen gas and its compound gas are produced as reactive gases. These halogen gases are then reacted with a metal plasma which may contain the same kind of halogen gas, so that the resulting compound is allowed to deposit as a thin film on the substrate. This process has merits that the danger of introduction of a highly-reactive halogen gas through a piping system is avoided and inclusion of impurities is also prevented.

The present invention will hereinafter be described specifically by the following Examples.

EXAMPLE 1

Figure 6:
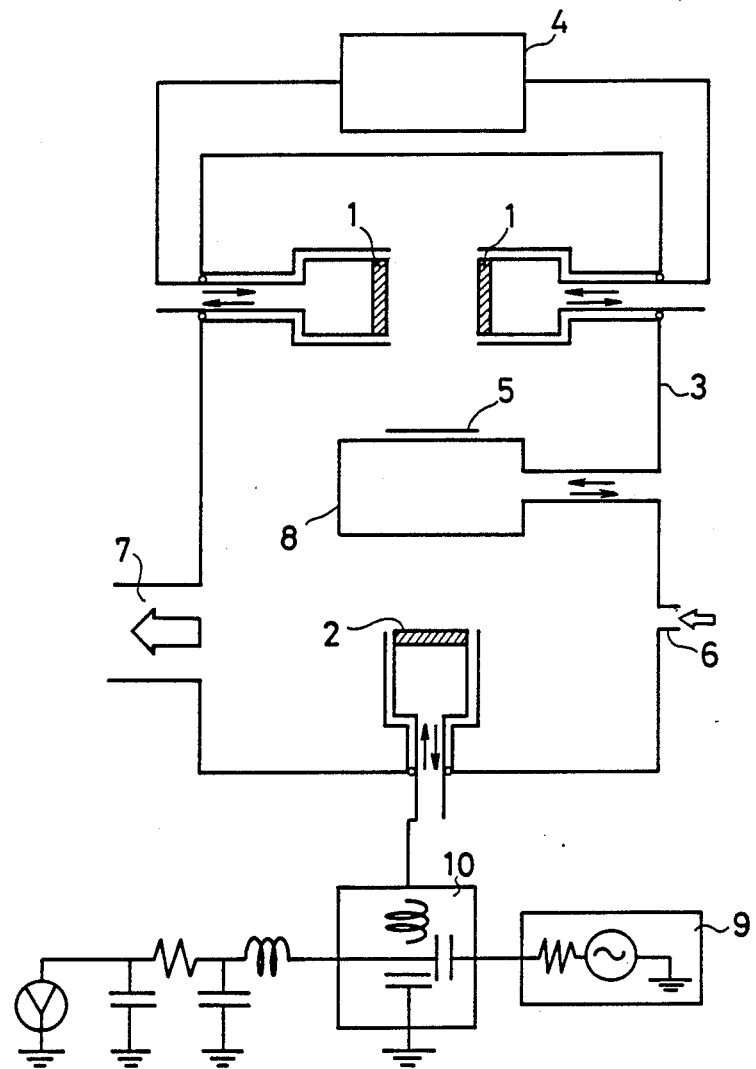
FIG. 6 is a simplified schematic view of an opposing-target DC,Rf sputtering apparatus employed in Examples of this invention.

An opposing-target DC,Rf sputtering apparatus depicted in FIG. 6 was used. $Fe_{90}B_{10}$ (at.%) was attached to opposing DC targets 1, which were cooled with water.

An Rf target 2 had been produced by press forming a halogen compound, $FeF_3$. After evacuating the interior of a vacuum compartment 3 to $5\times10^{-7}$ Torr, Ar gas was introduced to raise the interior pressure of the vacuum compartment to $1\times10^{-2}$Torr. There are also shown a DC power supply 4, a substrate 5, a feed port 6 for the argon gas, a pumping port 7, a water cooled substrate holder 8, an Rf power supply 9, and a matching circuit 10.

By setting the Rf output for the production of the halogen gas at 300 W for example and changing the DC output of the opposing DC $Fe_{90}B_{10}$ targets 1, it was possible to vary with ease the contents of B and F in an optically-transparent film to be formed on the substrate 5. Their crystalline structures were amorphous at F contents of 25 at.% and lower but peaks corresponding to fluoride crystals appeared in x-ray diffractions at F contents above 25 at.%.

Figure 7:
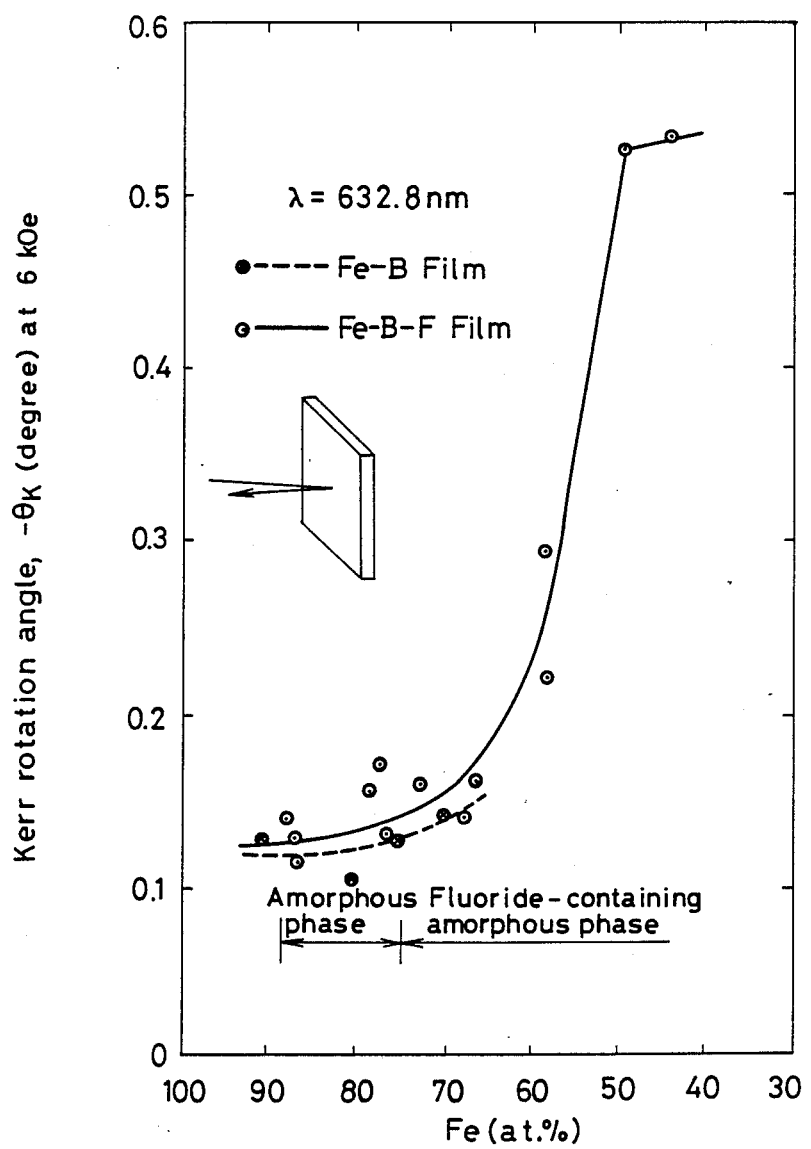
FIG. 7 is a graph showing the Fe dependence of the Kerr rotation angles of a sputtered Fe-B film and an Fe-B-F film produced using $Fe_{90}B_{10}$, both, in He-Ne laser.

FIG. 7 shows the Fe dependence of the Kerr rotation angles of sputtered Fe-B films and that of the Kerr rotation angles of Fe-B-F films produced from $Fe_{90}B_{10}$, both, in He-Ne laser. At about 50 at.% Fe, $\theta_K$ of 0.5° was exhibited.

The value of $\theta_K$ can be improved by incorporating Co and/or one or more of the elements recited in the claims in the Fe-B-F film.

EXAMPLE 2

Using such a sputtering apparatus as depicted in FIG. 6, the water-cooled substrate holder 8 was turned over 180° so that the substrate 5 was set on the side of the Rf target 2.

The Rf target 2 was produced by press-forming the halogen compound, $FeF_3$, by way of example. After evacuating the interior of the vacuum compartment 3 to $5\times10^{-7}$ Torr, Ar gas was introduced to raise the interior pressure of the vacuum compartment to $5\times10^{-3}$ Torr.

Figure 8:
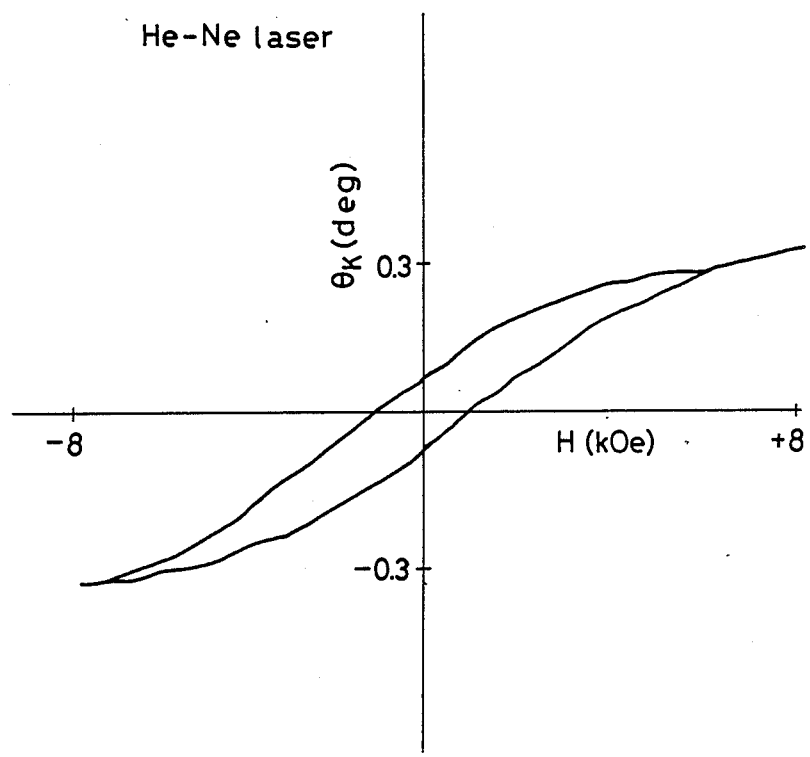
FIG. 8 illustrates a $\theta_K$-H hysteresis curve of a transparent and perpendicular magnetic film of $Fe_{40}F_{60}$ in He-Ne laser.

By setting the Rf output of the press-formed $FeF_3$ target at 250 W for example, a sputtered film was allowed to deposit on the substrate 5. Magnetic characteristics of the thus-obtained sputtered film were measured by VSM (vibrating-sample magnetometer). As a result, there was obtained a film having perpendicular magnetic anisotropy, namely, large anisotropy in a direction perpendicular to the plane of the film as depicted by way of example in FIG. 5. In addition, the magnetic field dependence of the Kerr rotation angle upon reflection by the Fe-F film was determined. A $\theta_K$-H hysteresis curve as shown in FIG. 8 was obtained. The value of $\theta_K$ was found to be 0.32° in He-Ne laser. This value was improved further on the side of longer wavelengths. It was also improved when a reflective plate was attached.

Figure 13:
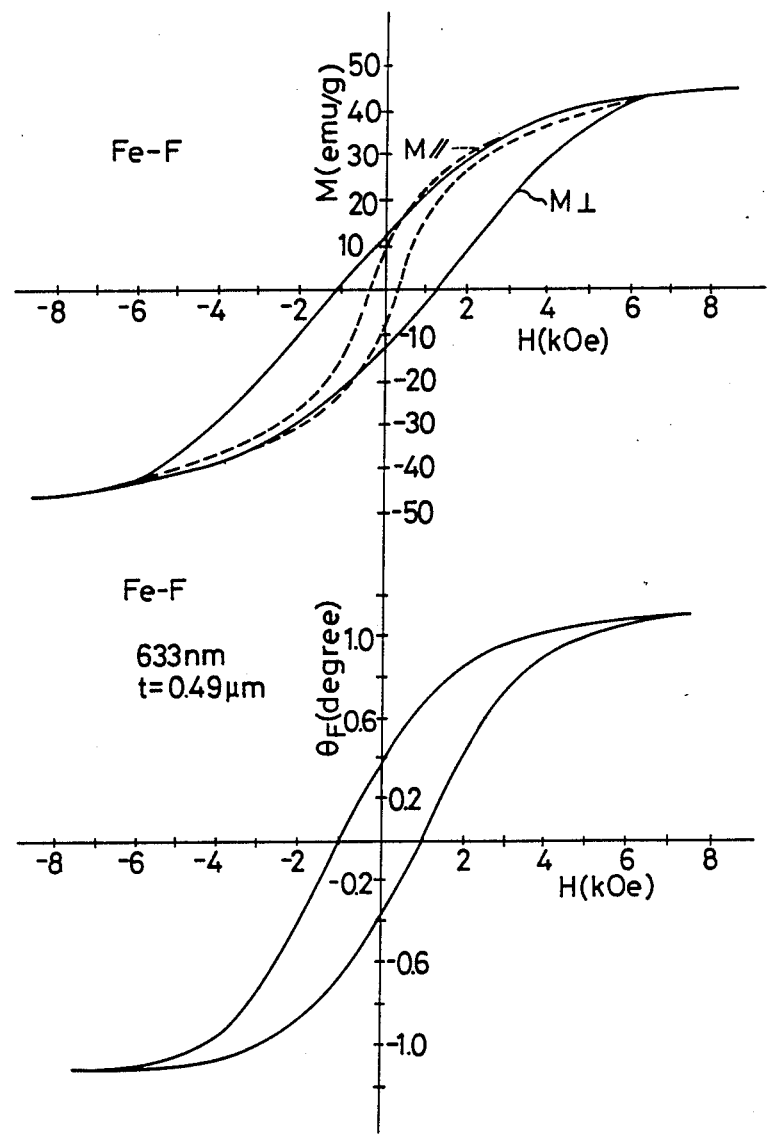
FIG. 13 illustrates $\theta_F$-H hysteresis curves of an Fe-F film upon optical transmission of He-Ne laser therethrough and the magnetic field dependence of magnetization.

The Faraday rotation angle of an Fe-F film upon transmission of He-Ne laser therethrough and the magnetic field dependence of magnetization were then determined. A $\theta_F$-H hysteresis curve was obtained as shown in FIG. 13. The Faraday coefficient was found to be $2.2\times10^4$ deg/cm The shape of the $\theta_F$-H hysteresis curve was similar to that of the M-H curve for M⊥, which is shown above the $\theta_F$-H hysteresis in the same figure. A $\theta_K$-H hysteresis curve was also obtained with a reflective plate. The value of $\theta_K$ was found to be 2.20° in a magnetic field of 7 kOe.

The perpendicular magnetic anisotropy energy and $\theta_K$ can be improved by incorporating one or more of Co and other elements, which are recited in the claims, in the Fe-F film.

EXAMPLE 3

In the same manner as in Example 2, $NiF_2$ was press-formed as an exemplary halogen compound to provide the Rf target 2. After depressurizing the interior of the vacuum compartment 3 to $5\times10^{-7}$ Torr, Ar gas was introduced to adjust the interior pressure of the compartment to $5\times10^{-3}$ Torr.

Figure 14:
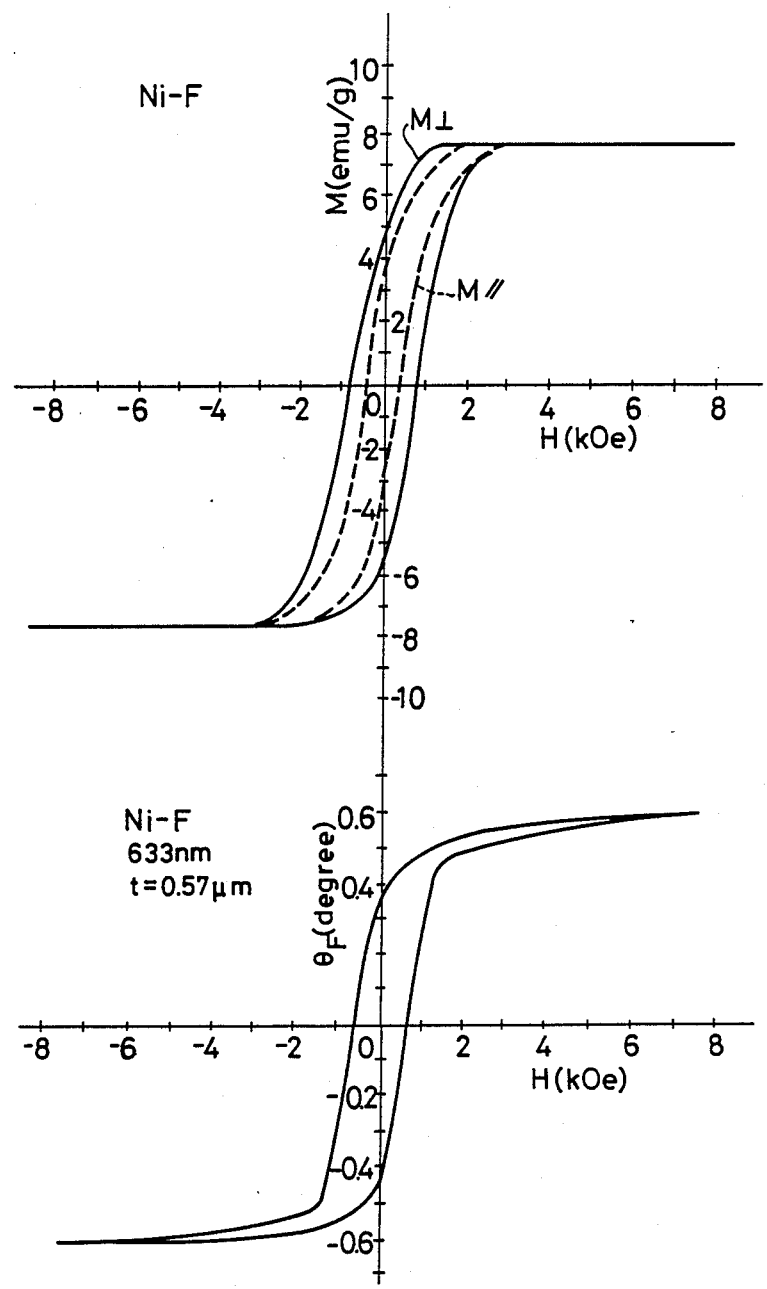
FIG. 14 shows magnetic characteristics of an Ni-F film and its $\theta_F$-H hysteresis curve.

While maintaining the Rf output of the press-formed $NiF_2$ powder target, for example, at 250 W, a sputtered film was allowed to deposit on the substrate 5. Magnetic characteristics and Faraday rotation angle of the resultant sputtered film were measured. There was obtained a perpendicular magnetic film which had positive perpendicular magnetic anisotropy energy in the perpendicular direction of the surface of the film as illustrated in FIG. 14. In addition, the magnetic field dependence of the Faraday rotation angle of the Ni-F film at He-Ne laser light source was determined. The magnetic field dependence of $\theta_F$ is shown in the lower part of FIG. 14. It has a similar figure as the M-H hysteresis curve for M⊥ illustrated in the upper part of FIG. 14.

A reflective plate was applied to the Ni-F film and the Kerr rotation angle was measured. It was found to be 1.21° in He-Ne laser. The Kerr rotation angle was found to be 0.7° at H=0.

The perpendicular magnetic anisotropy energy and $\theta_K$ can be improved by incorporating one or more of Fe, Co and other elements, which are recited in the claims, in the Ni-F film.

Shown as Examples in the following table are the compositions of thin film samples, which contain halogen elements, fall in composition within the composition recited in claim 1, show optical transparency and perpendicular magnetic anisotropy and have large Kerr rotation angles, along with their Kerr rotation angles.

TABLE

| Example | Composition, at. % | Kerr rotation angle, degree |
|---|---|---|
| 4 | $Fe_{30}Ni_{10}Co_{10}F_{50}$ | 0.6° |
| 5 | $Fe_{30}Ni_{30}F_{40}$ | 0.9° |
| 6 | $Ni_{40}Co_{20}F_{40}$ | 0.8° |
| 7 | $Fe_{30}Bi_5Co_5F_{60}$ | 1.2° |
| 8 | $Fe_{25}Bi_{10}Ni_5F_{60}$ | 1.4° |
| 9 | $Ni_{35}Si_5F_{60}$ | 0.5° |
| 10 | $Ni_{30}Si_{10}F_{60}$ | 0.7° |
| 11 | $Co_{30}Al_{10}F_{60}$ | 0.4° |
| 12 | $Co_{30}Al_5Bi_5F_{60}$ | 0.6° |

EXAMPLE 13

Figure 9:
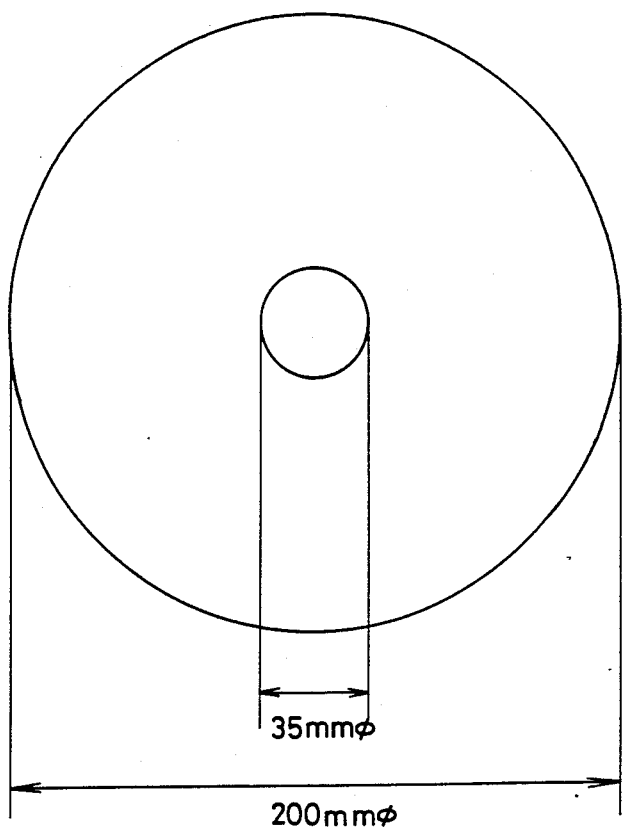
FIG. 9 is a plane view of a disks made of glass or a resin.

Using the sputtering apparatus shown in FIG. 6, a glass or resin disk of 200 mm × 35 mm × 1.2 mmt depicted in FIG. 9 were set on the water-cooled substrate holder 8. The disk was rotated at 20-200 rpm from the outside of the vacuum compartment 3. $FeF_3$ powder containing fine particulate metals such as Co, Bi and Te was placed by way of example on the Rf electrode, so that an optically-transparent and perpendicular magnetic film was caused to deposit to 500 Å on the glass disk. Thereafter, TbFeCo was placed on the Rf electrode so as to deposit it to 1500 Å on the film. A protective plate of SiO was then caused to deposit to 100 Å on the TbFeCo film.

A magneto-optical disk produced in the above manner had the following characteristics.

Figure 10:
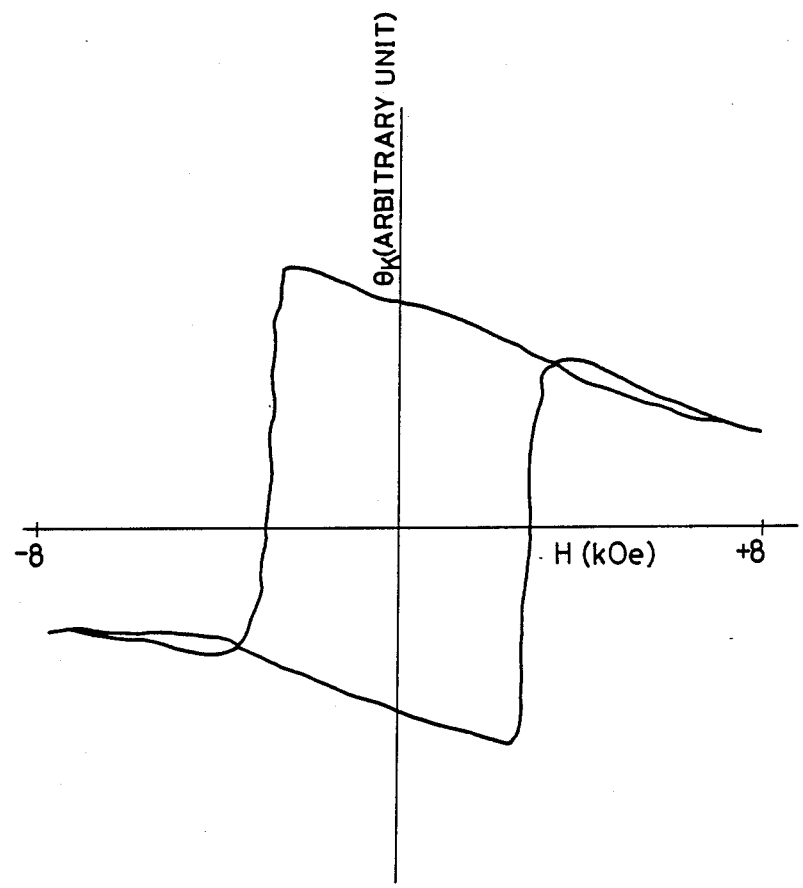
FIG. 10 shows a $\theta_K$-H hysteresis curve of a perpendicular magnetic TbFeCo film.

A $\theta_K$-H hysteresis curve of a perpendicular magnetic film of TbFeCo alone is shown in FIG. 10. The hysteresis of $\theta_K$ has a similar figure to the figure of the Ms-H hysteresis curve measured by VSM, thereby indicating that the TbFeCo film was a perpendicular magnetic film. Its Kerr rotation angle $\theta_K$ was 0.2° in He-Ne laser.

Figure 11:
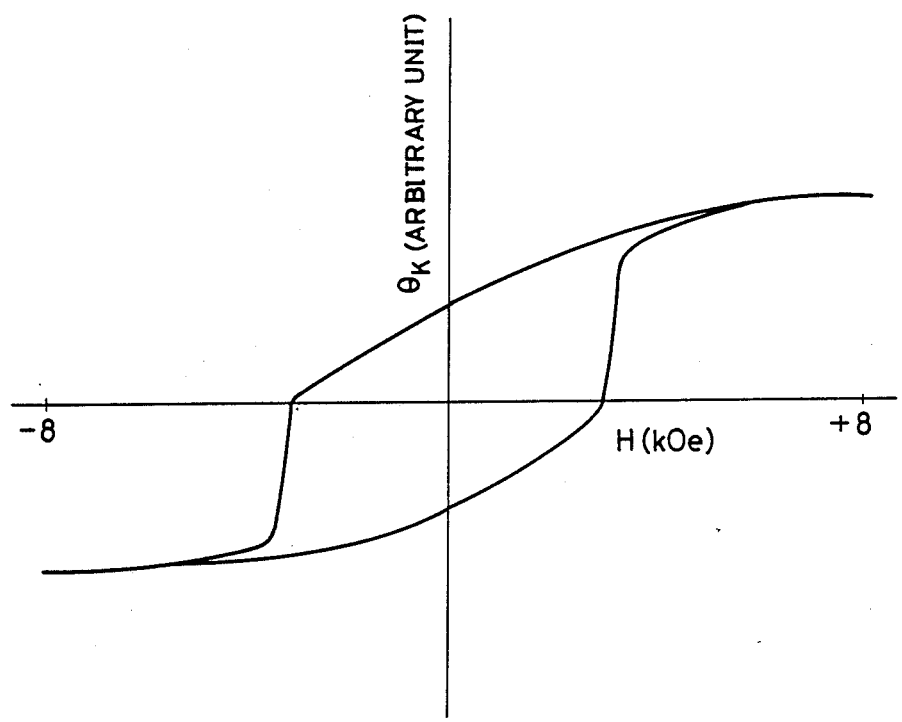
FIG. 11 depicts a $\theta_K$-H hysteresis curve of a perpendicular magnetic film of $Fe_{40}F_{60}$+TbFeCo.

An optically-transparent and perpendicular magnetic film of 500 Å according to this invention was then caused to deposit in advance on the disk, followed by deposition of a TbFeCo film having a thickness of 1500 Å. The $\theta_K$-H hysteresis curve of the thus-produced film substantially reflected the hysteresis of the $\theta_K$-H curve of TbFeCo as shown in FIG. 11. Its $\theta_K$ was found to be 0.7° in the wavelength range of He-Ne laser. This value increased further on the side of longer wavelengths. The S/N ratio of the thus-produced magneto-optical disk was then determined. An LED (wavelength: 800 nm) was used as a light source. The S/N ratio was found to be at least 60 dB.

As has been demonstrated above, the optically-transparent and perpendicular magnetic film of this invention is effective in enhancing the Kerr rotation angle so that the value of $\theta_K$ increases.

EXAMPLE 14

Use of an optically-transparent and perpendicular magnetic film of this invention as an optical recording medium will next be described by way of example.

Figure 12:
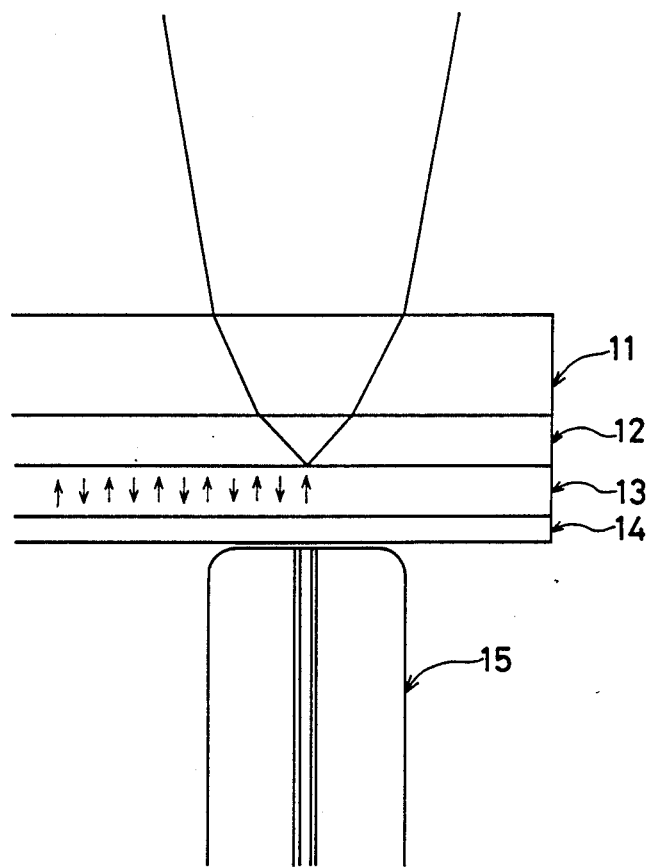
FIG. 12 schematically illustates a system making use of a medium of this invention, which permits writing by a perpendicular magnetic recording head and reading by optical head.

FIG. 12 schematically illustrates a system making use of the medium of this invention, which permits writing by a perpendicular magnetic head and optical reading (perpendicular magnetic recording and magneto-optical reading system). Numeral 11 indicates a glass disk or a resin disk. Designated at numeral 12 is the optically-transparent and perpendicular magnetic film of this invention. Designated at numeral 13 is a perpendicular magnetic film of a rare earth element-Fe-Co system. This film may not be required in some instances. There is also shown a plate 14, which serves not only as a reflective plate but also as a plate for lubricating the slide of a perpendicular magnetic recording head 15.

The above system will next be described in detail. This system has been developed in order to improve the drawbacks of the present magneto-optical recording system. The optical disks 11-14 are rotated at a high speed of 1,000-1,800 rpm. The perpendicular magnetic head 15 is spaced with a gap of about 50 Å from the protective plate 14. High-frequency writing is performed in the films 12, 13 as recording layers by the head 15. Although numeral 13 indicates the perpendicular magnetic film of the rare earth element-Fe-Co system, the film 12 has the same properties as the film 13. Information may therefore be written primarily in the optically-transparent and perpendicular magnetic film 12. Written magnetic domains are more stable when written in the multilayer film. The thus-written magnetic domains are then read out by a laser beam as shown in FIG. 12. The laser system is used exclusively for reading. Accordingly, the output of a semiconductor laser may be low and the stability of the laser beam source is high. In addition, the temperature of the recording medium does not increase substantially because it is no longer required to perform recording at the compensation or Curie point. The stability of the recording medium has hence been improved significantly compared with the present magneto-optical recording system. Since it is a recording method not accompanied by thermal diffusion, the writing, reading and overwriting speeds can be increased to those of current hard disks.

It is also possible to solve the drawback of the perpendicular magnetic recording method. It is the drawback of the vertical magnetic recording method that a high S/N ratio may not be fully ensured upon reading when writing bit areas are rendered smaller. The system making use of the present invention however permits use of small bit areas because the reading is performed magneto-optically. The recording density can therefore be maintained at substantially the same level as those of magneto-optical systems presently in use.

As has been described above, the use of the optically-transparent film of this invention, which has perpendicular magnetic anisotropy, makes it possible to complete a highly stable recording system which features high-speed and high-density writing, high-speed reading and high-speed erasing.

Having now fully described the invention, it will be apparent to one of ordinary skill in the art that many changes and modifications can be made thereto without departing from the spirit or scope of the invention as set forth herein.

What is claimed is:

1. A thin film consisting of a composition represented by the following formula (I):

$$J_x L_y Q_{(100-x-y)} \qquad (I)$$

wherein
J: an element represented by any one of element symbols F, Cl, Br and I, or a combination thereof;
L: an element represented by any one of element symbols B, C, Al, Si, P, As, Sb, Bi, Se, Te, Ti, V, Cr, Mn, Ga, Ge, Zr, Nb and Mo, or a combination thereof;
Q: either one of Fe, Ni or Co, or a combination thereof;
x: a value of 3-80; and
y: a value satisfying the following equation (II):

$$3 \leq x+y \leq 80 \qquad (II),$$

and said composition excludes $FeF_2$ and $FeF_3$, the location of the peak energy value for $L_\alpha$ in the soft x-ray emission spectrum for said film being not shifted from the location of the corresponding value for said Q metal and being different from the location of the corresponding value for a compound of Q and J so that said film is metallic and ferromagnetic, said thin film being optically transparent and having an amorphous structure containing halide crystal phase.

2. The thin film as claimed in claim 1, wherein said film exhibits perpendicular magnetic anisotropy.

3. A thin film as claimed in claim 1 wherein J is F, Q is Fe, the magnetization of said film is at least 60 emµ/g and the Kerr rotation angle is 0.5° when exposed to radiation having a wavelength of 632.8 nm when said film contains about 50 atomic % of F.

4. A thin film as claimed in claim 1 which has been prepared by subjecting a solid compound containing J to Rf sputtering conditions to generate J gas or J-containing gas, simultaneously subjecting targets containing L and Q to DC sputtering to generate a plasma, reacting said gas with said plasma and depositing atoms of J, L and Q on a substrate to form said thin film.

5. A process for the production of a halogen-containing thin film composed of a composition represented by the following formula (I):

$$J_xL_yQ_{(100-x-y)} \quad (I)$$

wherein
- J: an element represented by any one of element symbols F, Cl, Br and I, or a combination thereof;
- L; an element represented by any one of element symbols B, C, Al, Si, P, As, Sb, Bi, Se, Te, Ti, V, Cr, Mn, Ga, Ge, Zr, Nb and Mo, or a combination thereof;
- Q: either one of Fe, Ni or Co, or a combination thereof;
- x: a value of 3-80; and
- y: a value satisfying the following equation (II):

$$3 \leq x+y \leq 80 \quad (II),$$

and said composition excludes $FeF_2$ and $FeF_3$, which comprises, placing a compound of said J halogen in a reactive sputtering apparatus, decomposing said compound in said apparatus to produce a halogen-containing gas in situ in said apparatus, reacting said halogen-containing gas, in said sputtering apparatus, with a metal plasma or halogen-containing metal plasma and allowing the resultant compound to deposit as a thin film on a substrate.

6. A thin film as claimed in claim 1 in which x is from 5 to 60.

7. A thin film as claimed in claim 6 in which x is from 5 to 60.

8. A thin film as claimed in claim 8 in which x is from 5 to 60.

9. A thin film as claimed in claim 8 in which x is from 5 to 25, said film having an entirely amorphous structure.

10. A thin film consisting of a composition having the formaula $$F_xB_yFe_{100-x-y}$$

y is a number satisfying the equation $3 \leq x+y \leq 80$, and said composition excludes $FeF_2$ and $FeF_3$, said film exhibiting a Kerr rotation angle of about 0.5° at an F content of 40 to 50 atomic % when exposed to radiation having a wavelength of 632.8 nm, said film being ferromagnetic and optically transparent and exhibiting perpendicular magnetic anisotropy, said film exhibiting an average magnetic moment of at least about $1\mu_B$ per Fe atom and a magnetization of at least 60 emµ/g, the locations of the peak energy values for $FeL_\alpha$ and $FeL_\beta$ in the soft x-ray emission spectrum of said film being the same as the corresponding locations of the corresponding values for said Fe metal and being different from the locations of the corresponding values for a compound of F and Fe and wherein the peak height ratio of $L_\beta/L_{60}$ is higher as the content of the element F is higher, said film having an amorphous structure containing fluoride crystal phase.

11. A thin film as claimed in claim 10 containing above 25 atomic % of F.

12. A thin film as claimed in claim 11 containing a maximum of 50 atomic % of Fe.

* * * * *

UNITED STATES PATENT AND TRADEMARK OFFICE
CERTIFICATE OF CORRECTION

PATENT NO. : 4,925,742                                    Page 1 of 2
DATED      : May 15, 1990
INVENTOR(S): Eishu SUGAWARA et al It is certified that error appears in the above-identified patent and that said Letters Patent is hereby corrected as shown below:

Column 12, line 55; change "em$\mu$/g" to ---emu/g---.
Column 13, line 22; change "a halogen-containing" to
                    ---a halogen or halogen-containing---.
           line 23; change " halogen-containing" to
                    --- halogen or halogen-containing---.
           line 28; change "5 to 60" to ---3 to 60---.
           line 29; change "claim 6" to ---claim 3---.
           line 30; change "5 to 60" to ---3 to 60---.
           line 31; change "claim 8" to ---claim 10---.
           line 32; change "5 to 60" to ---3 to 60---.
Column 14, line  1; change "claim 8" to ---claim 10---.
           line  2; change "5 to 25" to ---3 to 25---.
           line  5; change "formaula" to ---formula---.
           line  8; insert ---wherein x is a number of from
                    3 to 80 and---.

UNITED STATES PATENT AND TRADEMARK OFFICE
CERTIFICATE OF CORRECTION

PATENT NO. : 4,925,742

DATED : May 15, 1990

INVENTOR(S) : Eishu SUGAWARA et al

It is certified that error appears in the above-identified patent and that said Letters Patent is hereby corrected as shown below:

Column 14, line 18; change "em$\mu$/g" to ---emu/g---.

line 25; change "$L_{60}$" to ---$L_\alpha$---.

Signed and Sealed this

Twenty-first Day of April, 1992

Attest:

HARRY F. MANBECK, JR.

*Attesting Officer*      *Commissioner of Patents and Trademarks*